United States Patent
Gunaratne

(10) Patent No.: US 9,573,600 B2
(45) Date of Patent: Feb. 21, 2017

(54) METHOD AND APPARATUS FOR GENERATING AND USING DRIVER SPECIFIC VEHICLE CONTROLS

(71) Applicant: Toyota Motor Engineering & Manufacturing North America, Inc., Erlanger, KY (US)

(72) Inventor: Pujitha Gunaratne, Windsor (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/577,958

(22) Filed: Dec. 19, 2014

(65) Prior Publication Data

US 2016/0176412 A1    Jun. 23, 2016

(51) Int. Cl.
| | |
|---|---|
| *G05D 1/00* | (2006.01) |
| *B60W 50/12* | (2012.01) |
| *B60W 10/18* | (2012.01) |
| *B60W 10/10* | (2012.01) |
| *B60W 10/20* | (2006.01) |
| *B60W 40/09* | (2012.01) |
| *B60W 50/00* | (2006.01) |

(52) U.S. Cl.
CPC .............. *B60W 50/12* (2013.01); *B60W 10/10* (2013.01); *B60W 10/18* (2013.01); *B60W 10/20* (2013.01); *B60W 40/09* (2013.01); *B60W 2050/0005* (2013.01); *B60W 2050/0014* (2013.01); *B60W 2550/10* (2013.01); *B60W 2550/20* (2013.01); *B60W 2600/00* (2013.01)

(58) Field of Classification Search
CPC ...................................................... B62D 6/00
See application file for complete search history.

(56) References Cited

U.S. PATENT DOCUMENTS

| | | | |
|---|---|---|---|
| 7,537,293 B2 | 5/2009 | Lin et al. | |
| 7,809,487 B2* | 10/2010 | Syed | B60T 8/174 701/70 |
| 7,899,610 B2* | 3/2011 | McClellan | B60R 16/0236 701/103 |
| 8,068,953 B2* | 11/2011 | Sakuma | B60W 40/09 180/443 |

(Continued)

FOREIGN PATENT DOCUMENTS

| | | |
|---|---|---|
| JP | 2010-072730 A | 4/2010 |
| JP | 2010-191517 A | 9/2010 |

*Primary Examiner* — Jonathan M Dager
(74) *Attorney, Agent, or Firm* — Christopher G. Darrow; Darrow Mustafa PC

(57) ABSTRACT

A driver-specific vehicle control method is provided that can adjust one or more vehicle control systems in response to a difference in current driver driving characteristics with respect to safe driver driving characteristics on the same roadway type and vehicle operating conditions. The method maintains a driver score for each driver of a vehicle, in the form of a set of the driver's driving characteristics scores for each different roadway type. The method, via a control apparatus, determines a current position of the vehicle on a roadway and the roadway features to select the appropriate driver score for comparison. When the driver's score exceeds a threshold difference from a safe driver score on the same roadway type, the method can adjust a control system parameter.

13 Claims, 6 Drawing Sheets

(56) References Cited

U.S. PATENT DOCUMENTS

| | | | | |
|---|---|---|---|---|
| 8,280,601 B2* | 10/2012 | Huang | B60W 30/12 | 701/1 |
| 8,564,426 B2* | 10/2013 | Cook | G07C 5/085 | 340/439 |
| 8,634,980 B1* | 1/2014 | Urmson | G05D 1/0214 | 701/23 |
| 8,698,639 B2* | 4/2014 | Fung | B60K 28/06 | 340/576 |
| 8,718,861 B1 | 5/2014 | Montemerlo et al. | | |
| 8,731,736 B2* | 5/2014 | Chang | B60W 50/14 | 340/576 |
| 2004/0249533 A1* | 12/2004 | Wheals | B60T 8/172 | 701/36 |
| 2005/0137757 A1* | 6/2005 | Phelan | G01M 17/00 | 701/1 |
| 2007/0001831 A1* | 1/2007 | Raz | B60R 16/0231 | 340/439 |
| 2007/0050127 A1* | 3/2007 | Kellum | G01C 21/3697 | 701/439 |
| 2007/0290867 A1* | 12/2007 | Kuramori | B60Q 9/00 | 340/576 |
| 2008/0133121 A1* | 6/2008 | Sato | F02D 41/00 | 701/123 |
| 2009/0040054 A1* | 2/2009 | Wang | B60W 30/095 | 340/576 |
| 2009/0088918 A1* | 4/2009 | Takenaka | B60T 8/17551 | 701/31.4 |
| 2009/0287368 A1* | 11/2009 | Bonne | B60T 7/12 | 701/31.4 |
| 2010/0055649 A1* | 3/2010 | Takahashi | B60W 50/082 | 434/66 |
| 2010/0198456 A1* | 8/2010 | Komori | B60W 40/09 | 701/33.4 |
| 2010/0209883 A1* | 8/2010 | Chin | G09B 19/167 | 434/65 |
| 2010/0211270 A1* | 8/2010 | Chin | B62D 6/007 | 701/44 |
| 2011/0022266 A1* | 1/2011 | Ippolito | B60G 17/018 | 701/37 |
| 2011/0251752 A1* | 10/2011 | DeLarocheliere | G07C 5/008 | 701/31.4 |
| 2011/0254655 A1* | 10/2011 | Maalouf | G06Q 30/02 | 340/3.1 |
| 2012/0083947 A1* | 4/2012 | Anderson | B60W 30/09 | 701/3 |
| 2012/0123806 A1* | 5/2012 | Schumann, Jr. | G08G 1/096775 | 705/4 |
| 2012/0277947 A1* | 11/2012 | Boehringer | B60W 30/17 | 701/23 |
| 2013/0073112 A1* | 3/2013 | Phelan | G06Q 40/00 | 701/1 |
| 2013/0177202 A1* | 7/2013 | Dierks | B60Q 1/143 | 382/103 |
| 2014/0236466 A1* | 8/2014 | Doron | G06Q 10/06 | 701/123 |
| 2014/0309806 A1* | 10/2014 | Ricci | B60Q 1/00 | 701/1 |
| 2015/0053066 A1* | 2/2015 | Hampiholi | B60W 50/14 | 84/602 |
| 2015/0158495 A1* | 6/2015 | Duncan | B60W 40/09 | 701/1 |
| 2015/0187016 A1* | 7/2015 | Adams | G06Q 40/08 | 705/4 |
| 2015/0232065 A1* | 8/2015 | Ricci | B60R 25/01 | 701/36 |
| 2015/0269446 A1* | 9/2015 | Takemae | G06K 9/00798 | 382/199 |
| 2015/0336587 A1* | 11/2015 | Inoue | B62D 6/00 | 701/41 |
| 2016/0001781 A1* | 1/2016 | Fung | G06F 19/345 | 701/36 |

* cited by examiner

METHOD AND APPARATUS FOR GENERATING AND USING DRIVER SPECIFIC VEHICLE CONTROLS

BACKGROUND

The present method relates, in, general, to methods and apparatus for adapting vehicle control systems to a driver's specific driving style.

Vehicles are provided with a number of control systems, which can be varied, based on road and weather conditions, and more particularly, to a driver's particular preferences. Personalizable vehicle controls, such as stability control, and acceleration and brake assist controls, forward crash warning timing, etc., can be controlled by setting options under general headings such as sport, economy, touring, etc. Such modes are usually automatically selected by the driver depending upon the driver's preference, the road conditions that the driver is or expects to be traveling on, i.e., dry, wet, icy, etc., and the type of road, namely, urban streets, rural roads and limited access highways.

However, such general modes of operation are set by the vehicle manufacture in for the different categories of sporting, economy, touring, etc., and average driver skills and not to the specific driving characteristics of a particular driver in a particular vehicle.

Every driver has a different driving characteristic or style, which can vary depending upon the roadway features. A particular driver can, for example, have a different skill level or score for his or her driving characteristics on a limited access, high speed highway, two or multi-lane rural roads, and two or multiple lane urban streets. Such roadway features can also include, for each general type of roadway, the type of roadway segment on which the vehicle is traveling, such as straight, curved, exit or entrance ramp, congested urban traffic, traffic lights, perpendicular intersection turns, etc.

A driver may have a high level of skill in certain of these roadway features, but may have a lower skilled level in other roadway features. Each driver also varies in his or her driving characteristics with respect to acceleration from a stop; such as when a traffic light turns green or when a driver first applies the brakes to bring the vehicle to a stop in congested traffic or at a traffic light, how much distance or headway the driver leaves between his or her vehicle and the vehicle to the immediate front of his or her vehicle. This separation distance or headway affects forward crash warning timing, acceleration and brake assist mode, cruise control, etc.

In addition to the above described roadway features, the driver's driving characteristics can also vary significantly depending upon the roadway surface i.e., paved, concrete, asphalt, dirt, gravel, deteriorating with potholes, etc. In addition, weather conditions, such as snow and ice, rain, dry, etc., also influence a driver's driving characteristics.

It would be desirable to provide driver specific vehicle controls, which can be adapted to a particular driver's driving characteristics, in comparison to safe driver driving characteristics, for all roadway features and roadway conditions.

SUMMARY

A method and apparatus for implementing driver specific vehicle controls include determining a driver's driving characteristics in a plurality of different roadway features, roadway type, traffic conditions and weather conditions, and determining the current roadway type over which a vehicle is moving; comparing the driver's driving characteristics for the current roadway features and type with safe driver driving characteristics for the same roadway features and type. Based on the comparison, the method and apparatus can select a vehicle system parameter for adjustment if the current driver's driving characteristics score exceeds the safe driver driving characteristics score by a threshold amount and actuate the vehicle control system by the selected vehicle system parameter adjustment.

The method further includes selecting the adjustable vehicle control systems to include at least one of vehicle traction control, vehicle stability control, vehicle acceleration, and vehicle braking.

The method includes determining vehicle drift from a center of a lane of a roadway by at least one camera mounted on the vehicle, the camera positioned to image lane markers on both sides of the lane in on the roadway. In response to vehicle drift, a control system may manipulate individual vehicle wheel torque.

The method and apparatus can determine the number of times that the vehicle drifts from the center of a lane in any one type of roadway condition.

The method and apparatus can determine different driver driving characteristics scores for one or more different roadway features, including one or more of a straight roadway, a curved roadway, an urban roadway, a highway, a rural roadway, and a multilane roadway. The method and apparatus can also determine different driver driving characteristic scores for each of the roadway features and, in addition, for straight or curved roadways, congested traffic conditions and at a traffic light or stop light. The method and apparatus can determine the driver's driving characteristic score based on one or more of a driver's skill level, a driver's years of driving experience, the driver's driving violations, and collisions.

The method and apparatus provide vehicle sensor outputs including one or more outputs from at least one camera, a radar, map data, a GPS, collision detectors, acceleration and deceleration, and braking pedal force.

BRIEF DESCRIPTION OF THE DRAWING

The various features, advantages and other uses of the present method and apparatus will become more apparent by referring to the following detailed description and drawing in which.

DETAILED DESCRIPTION

A driver specific vehicle control method and apparatus are disclosed which, during operation of the vehicle, compares a driver's preexisting and current driving characteristics, under the existing roadway features, roadway conditions and vehicle operating conditions, with safe driver driving characteristics under the same roadway features and vehicle operating conditions to determine if the driver's driving capabilities are within a threshold value of safe driver driving characteristics. When a significant difference from safe driving characteristics is detected, the apparatus and method can select a vehicle control system parameter for adjustment and implement the adjustment to maintain the vehicle within safe operating conditions. This provides a current update and adjustment of vehicle control systems for efficient and safe vehicle operation as the vehicle driver encounters different roadway conditions or features.

The control method and apparatus also enable a significant change in the driver's current driving characteristics as compared to the driver's prior history of the driving characteristics to be detected so that an appropriate vehicle control system parameter adjustments made to maintain safe vehicle operation.

Figure 1:
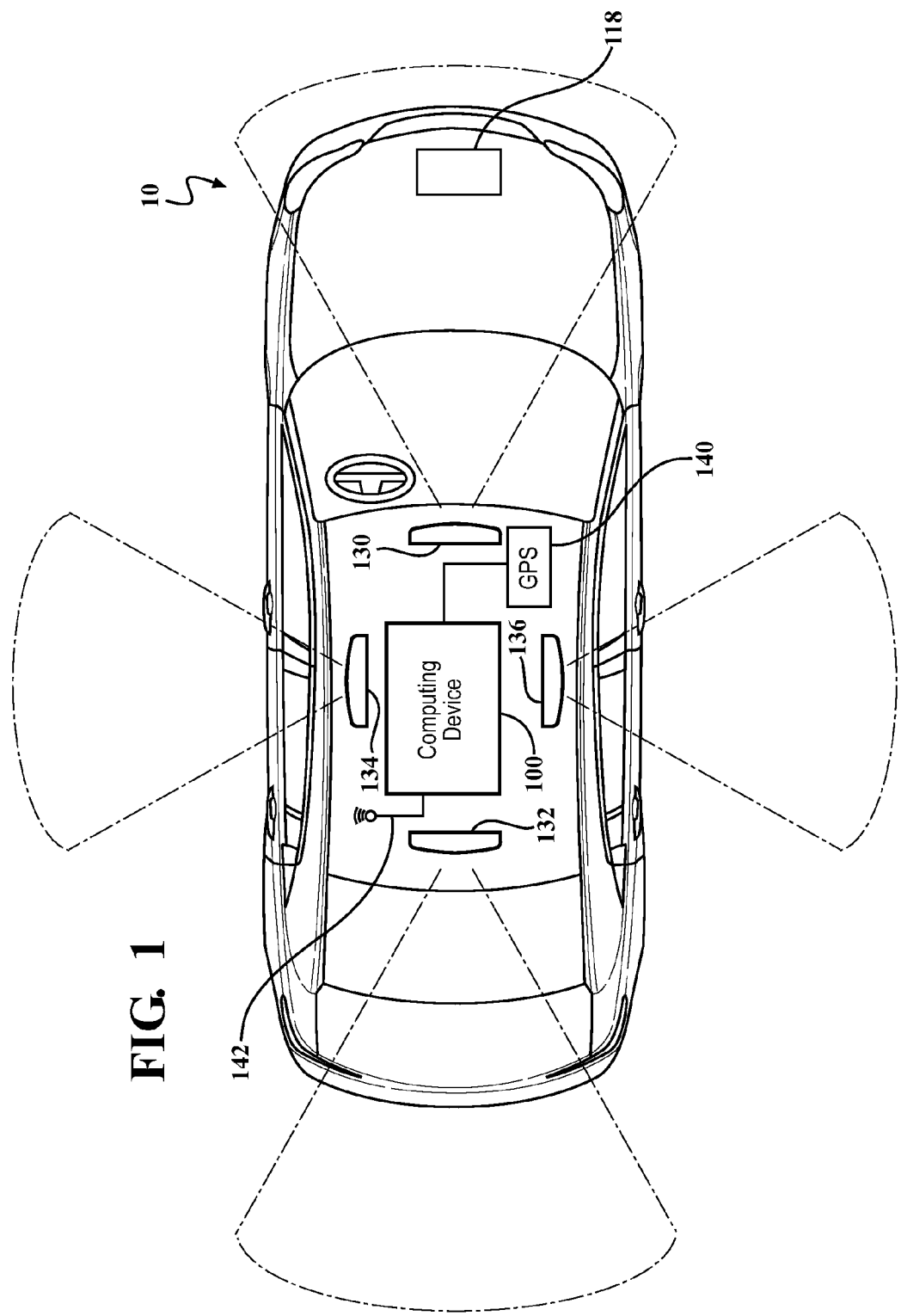
FIG. 1 is a pictorial representation of a vehicle having roadway feature sensors for implementing the method and apparatus for generating and using driver specific vehicle controls.
Figure 2:
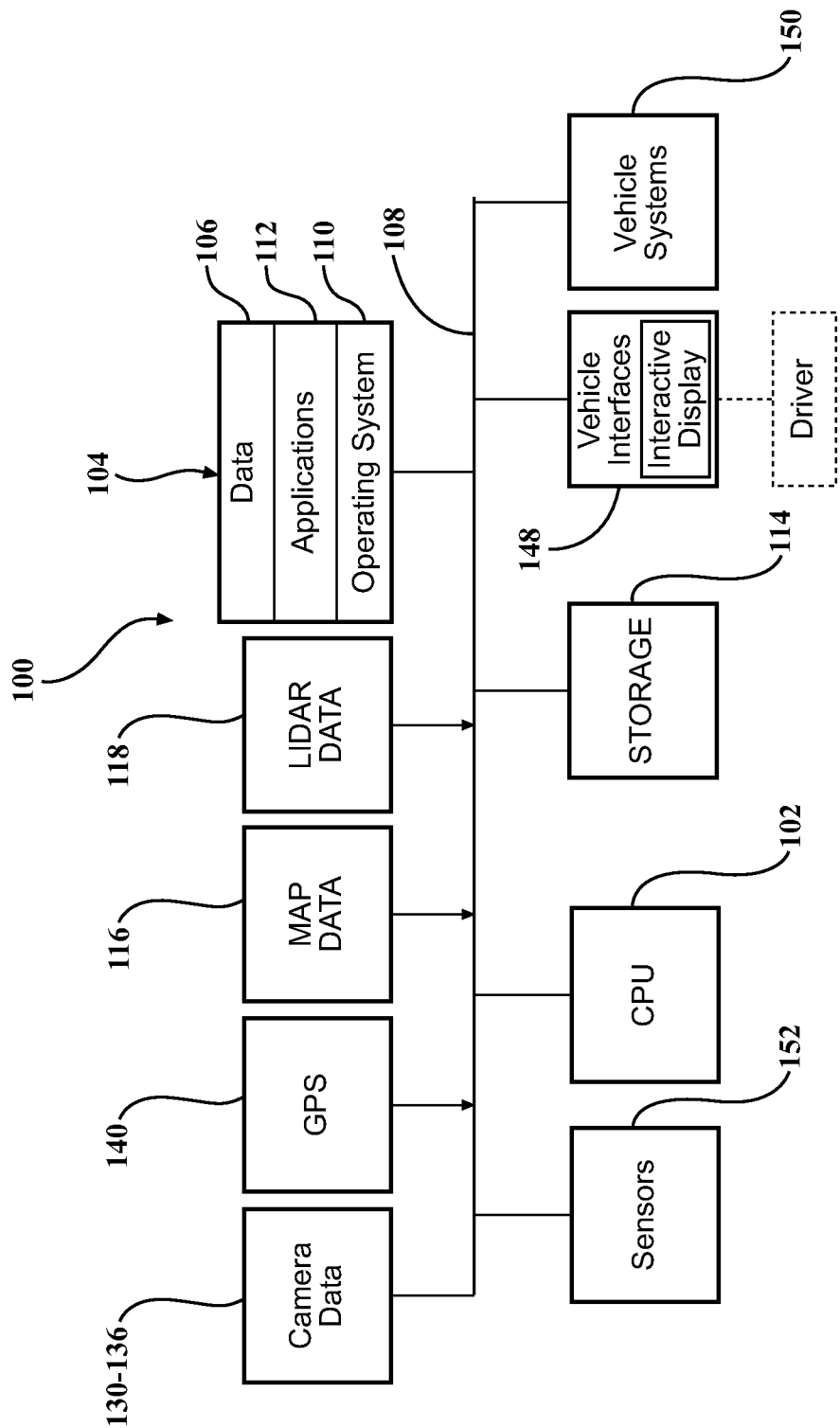
FIG. 2 is a block diagram of a computing device for implementing the disclosed method.

A method for generating driver specific vehicle control can be implemented on a computing device 100 shown in a block diagram form in FIGS. 1 and 2. The computing device 100 can be any type of computing device, including a handheld, desktop, or other form of single computing device, or it can be formed of multiple computing devices. A CPU 102 in the computing device 100 can be a conventional central processing unit, multiple CPUs, or any other type of device, or multiple devices, capable of manipulating or processing information. A memory 104 in the computing device 100 can be a Random Access Memory device (RAM) or any other suitable type of storage device. The memory 104 can include data 106 that is accessed by the CPU 102 using a bus 108. The memory 104 can also include an operating system 110 and installed applications 112. The installed applications 112 include programs that permit the CPU 102 to perform the method described herein.

The computing device 100 can also include secondary, additional, or external storage 114, for example, a memory card, flash drive, or other forms of computer readable medium. The installed applications 112 can be stored in whole or in part in the secondary storage 114 and loaded into the memory 104 as needed for processing.

The vehicle 10 includes a number of vehicle control systems 150 that can be adjusted in terms of performance parameters. Such vehicle systems 150 can include the vehicle traction control system, stability system, acceleration and deceleration, brake assist, forward crash warning timing, for example. Each vehicle control system 150 has suitable adjustable system parameters that can be controlled, as described hereafter, to vary the performance of each control system depending upon the driver's driving characteristics, the existing or current roadway shape and roadway conditions, traffic congestion, weather, etc.

The vehicle 10 also includes a number of onboard sensors, such as a forward crash warning sensor indicative of an eminent crash, an actual crash sensor or accelerometer indicative of the deformation of the portion of the exterior body panels on impact with another object, brake pedal force sensor, acceleration and deceleration levels of the vehicle, etc. These various sensors, generally indicated by reference number 152 in FIG. 2, are input to the computing device 100.

Figure 3:
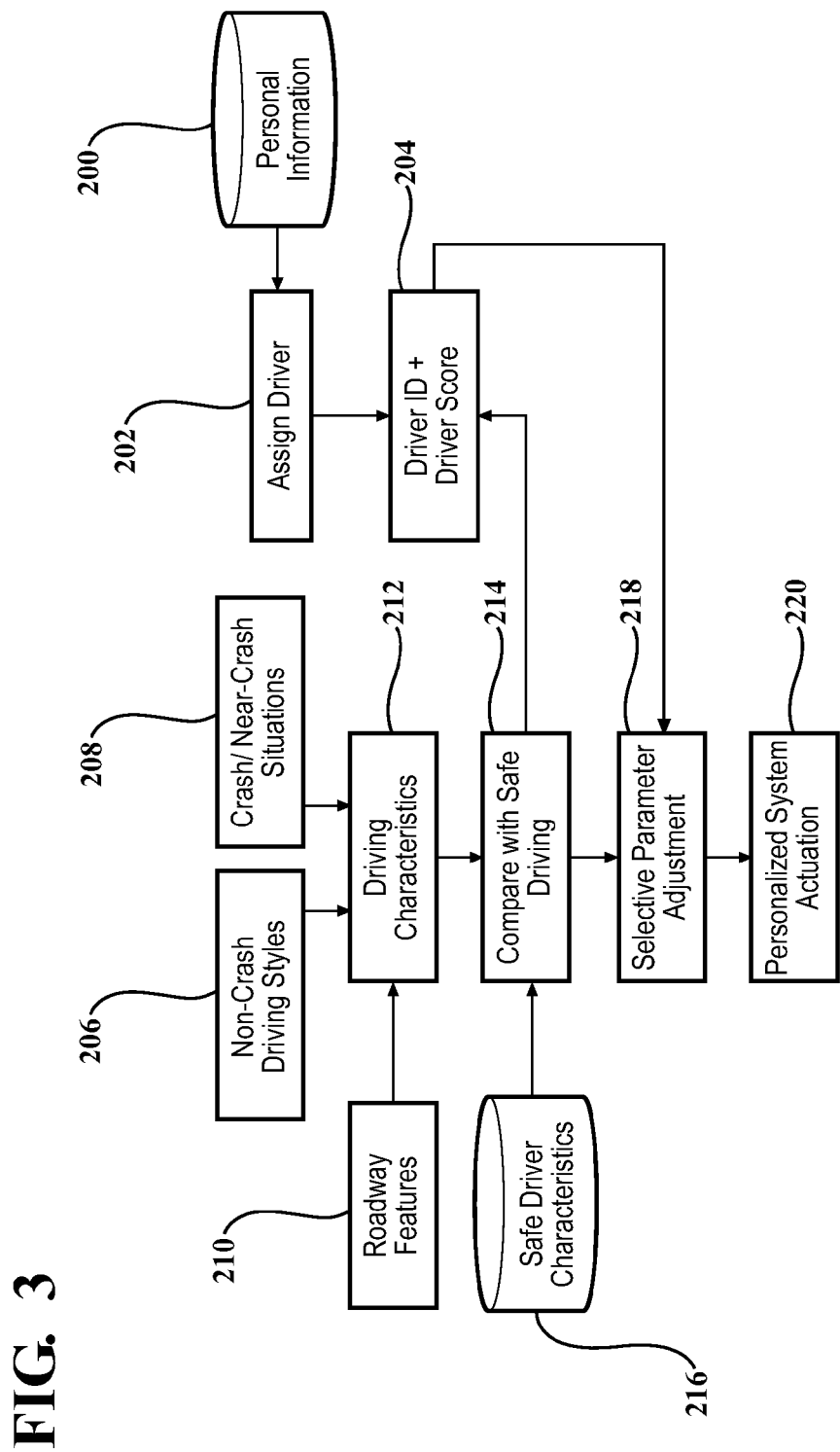
FIG. 3 is a block diagram of a sequence flow of operation used in the method and apparatus for determining vehicle driver characteristics and generating personalized vehicle control system actuation.

As shown in FIG. 3, the CPU 102 executes program instructions stored in the memory 104 or external memory storage 114 in response to the various inputs shown in FIG. 2.

The memory 104, or the external memory storage 114, may include personal information 200, FIG. 3, about the driver or drivers who would normally drive a particular vehicle. This personal information, such as the driver's name or other personal identification, is input with the driver assigned to or driving the vehicle in step 202. The assignment of the driver can be through the vehicle interface or interactive display 148 where the CPU 102 displays a list of available drivers authorized or expected to drive the vehicle. The driver can then select his name.

Next, the CPU 102, in step 204, accesses the driver's driving characteristics score. This score is based on the driver's skill level, including the number of years of driving, the number of years of driving in a particular vehicle, as well as other factors described hereafter.

The driver's score can also include the driver's driving record with the state driver licensing bureau which would include traffic or moving violations, collisions, collisions which were the fault of the driver, and other factors impacting on the driver's driving record.

During driving, the CPU 102 collects information relating to non-crash driving styles in step 206 and crash or near crash situations in step 208 using the onboard sensors 152, remotely accessed data sources and any or all of the onboard cameras 130-136, the radar 118, the GPS system 140, and map data 116.

The driver's score is not a total combined score for all driving conditions, but rather, a series or set of scores, where each score is identified with the driver's driving characteristics on a particular type of roadway, roadway condition, weather, etc. The roadway features from 210 are input to the CPU 102. The roadway features include separate categories for urban roadways, rural roadways, highway or restricted access freeways, as well as any of these roadway categories with straight segments, curved segments, exit ramps with straight or curved segments, urban intersections with traffic lights, congested urban or freeway traffic conditions, etc. The categories are an attempt to monitor the driver's driving capabilities in all types of roadway features, weather conditions, etc.

Figure 4:
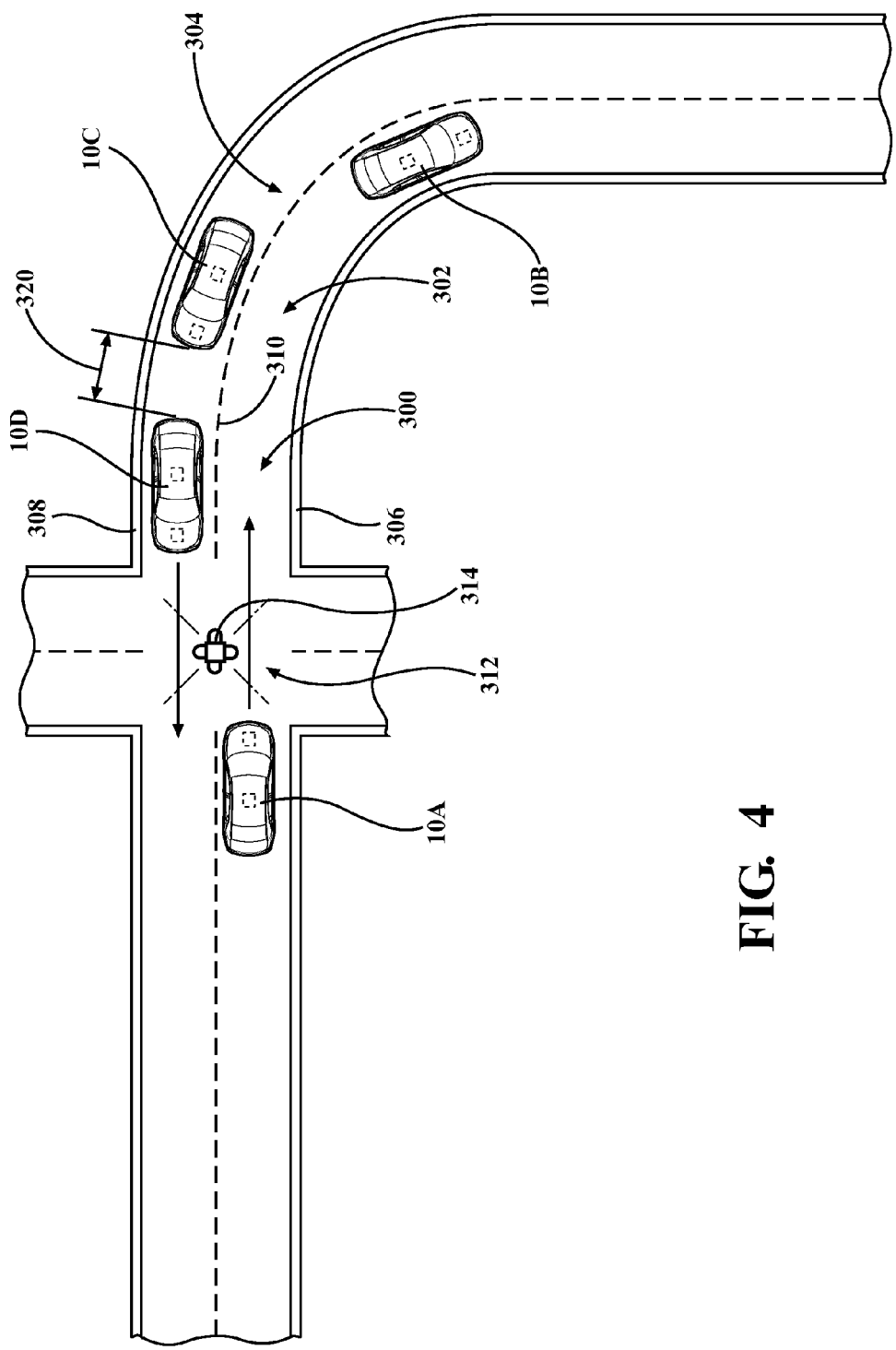
FIGS. 4, 5, and 6 are pictorial representation of different roadway features monitored in the present method and apparatus.

During driving, the CPU 102 constantly receives information from the GPS 140 and the map data 116 to determine the current location of the vehicle 10 and the type of roadway in which the vehicle 10 is currently on or moving along. This enables the CPU 102 to immediately identify the current roadway feature of the vehicle 10 as well as the driver's score for that particular type of roadway feature. FIG. 4 illustrates one type of roadway feature in a form of a two lane urban roadway 300. The roadway 300 includes two lanes 302 and 304, although multiple lanes for each direction of traffic may also be provided in the roadway 300.

As is conventional, the roadway 300 includes a pair of outer continuous lane markers 306 and 308 and center lane markers 310 dividing the two lanes 302 and 304. The center located lane markers 310 are typically dashed, but can represent a continuous yellow or white line or lines.

The roadway 300 also includes an intersection 312 with another roadway and a traffic light 314 at the intersection 312.

In the following description of the method and apparatus, the driver's driving characteristics will be computed and updated for many different types of driving conditions on the roadway 300. For example, the driver's driving characteristics when in the vehicle 10A stopped at the traffic light 314 will be scored with respect to the driver's driving characteristics in how hard or how early or late the driver applies the brakes when approaching an amber or red light 314 at the intersection 312. The driver's score is also computed for the rate of acceleration of the vehicle's 10A when the traffic light 314 turns green or a vehicle located in front of the vehicle 10A accelerates when the light 314 turns green.

The driver's score on the roadway 300 is also calculated when the vehicle 10B traverses a curve. In this instance, the cameras 130-136 can detect the outer lane marker 306 and the center lane marker 310 and thereby calculate the degree of drift from the center of the lane 302 as the vehicle 10B traverses the curved portion of the roadway 300. At the same time, the speed that the driver uses when traversing the curved portion of the roadway 300 will be combined with the drift from left to right of the center of the lane 302 to calculate an urban curved road driver characteristic score.

It is also shown in FIG. 4, for vehicle 10C, that the radar 118 can be employed to determine the space 320 that the driver of the vehicle 10C maintains between the vehicle 10C and the immediately preceding vehicle 10D. This distance 320 is combined with the type of roadway 300, and the speed or closing or opening relative speed of the vehicles 10C and 10D.

Figure 5:
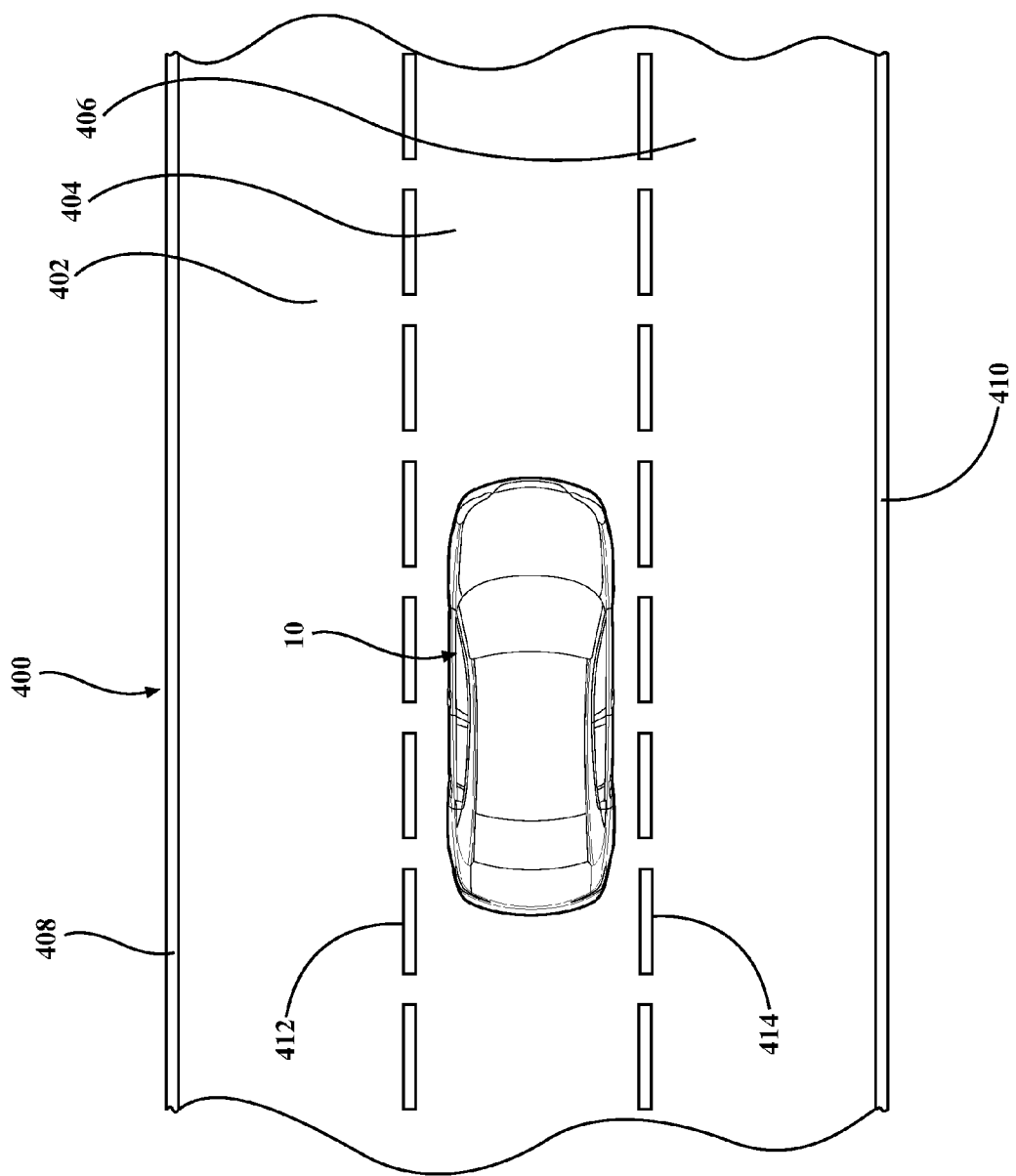

FIG. 5 depicts a restricted access highway or freeway 400 containing two or more lanes, with three lanes 402, 404, and 406 shown by way of example. The outer side edges of the outer lanes 402 and 406 carry continuous lane markers, such as white lane markers 408 and 410. Dashed lane markers 412 and 414 typically separate the interior lanes 402, 404, and 406.

The method and apparatus enables the driver's driving characteristics to be scored for the straight portion of the high-speed restricted access highway or freeway 400 shown in FIG. 5. The drift of the vehicle 10 from the left or right of center of the lane 404 can be determined along with the vehicle's speed to calculate part of the driver score for straight highway roadways. The same applies if the roadway 400 curves or bends at a degree which would require a change in speed of the vehicle.

Figure 6:
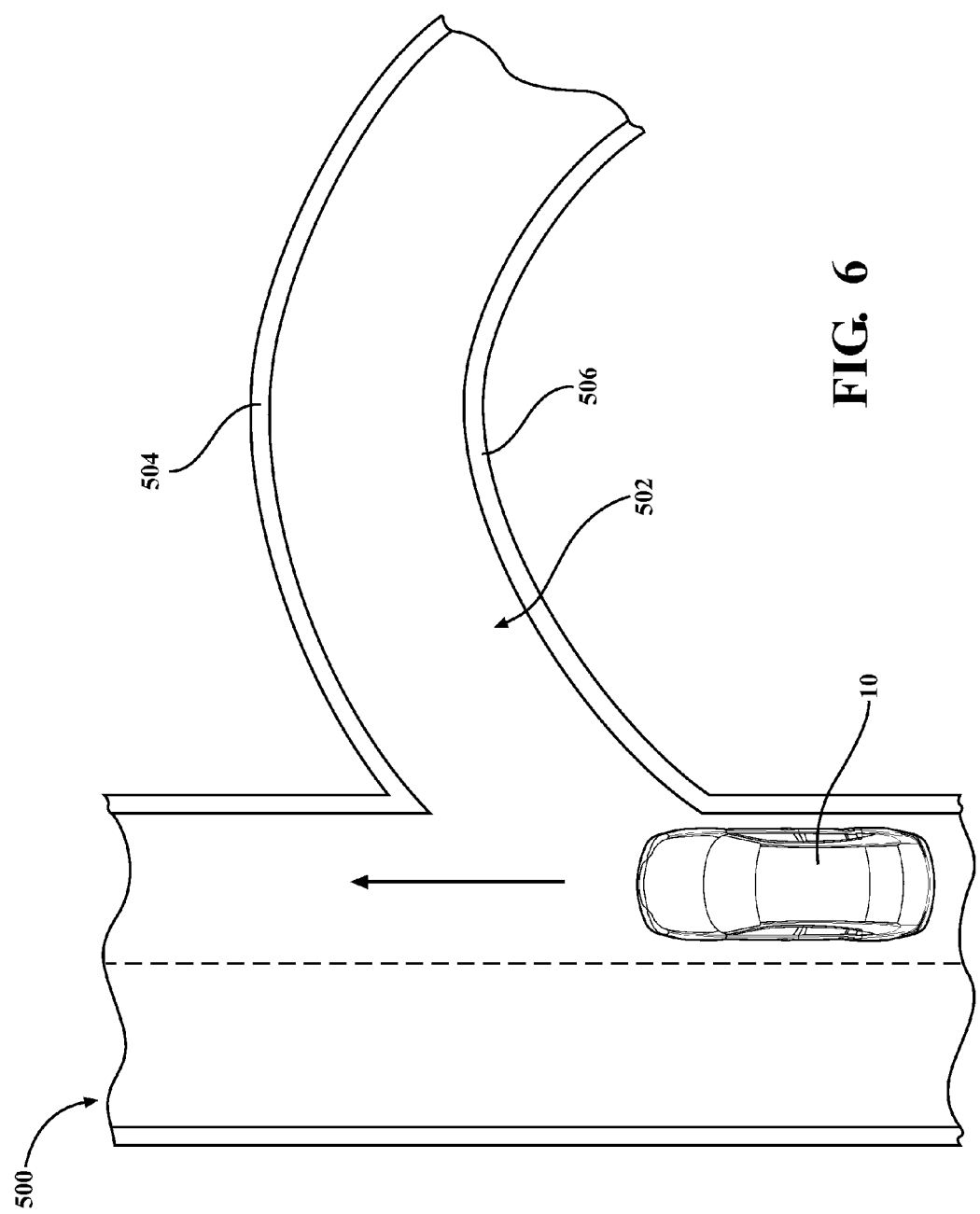

FIG. 6 depicts yet another roadway feature in which a two lane restricted access highway or freeway 500 has an exit lane 502 with a significant bend or curve. The exit ramp 502 will typically carry outer lane markers 504 and 506. The driver's driving characteristics, such as the degree of drift left or right or center of the exit lane 502 with respect to the outer lane markers 504 and 506 can be calculated by using the front or side cameras 130, 134 and 136 along with the GPS and map data to determine the degree of curve and the fact that the vehicle 10 is traversing a curved exit lane 502 of the highway 500.

A similar calculation of the driver's driving capabilities is done for an entrance ramp to the highway 500. Such calculations would include the speed of the vehicle when merging unto the main portion of the highway 500, the vehicle speed traversing the entrance ramp, whether the entrance ramp is straight or curved, etc.

In this manner, the driver's prior history of driving characteristics under all types of roadway features is calculated separately for each type of roadway feature.

Current weather or roadway conditions, such as dry, dry and sunny, dry and overcast, wet, snowy, icy, day or night conditions may also be factored into the driver's characteristic score for each type of roadway feature.

With this information, the CPU 102 is thereby able to determine the driver's score representing the driver's driving characteristics for the particular roadway feature in which the driver is currently traversing with the vehicle 10, in step 212 in FIG. 3. This driving characteristic or score is compared with safe driver's driving characteristics in step 214. The safe driving characteristics are pre-stored safe driver characteristics from a database 216 input to the CPU or accessible by the CPU 102. The safe driver characteristics can be baseline data set of driving styles for safe, typically professional drivers, traversing the same roadway feature as the driver is currently traversing in the vehicle 10, under the same roadway conditions, i.e., sunny, night, overcast, dry, wet, icy, etc.

As a result of this comparison, the CPU 102 can determine the degree of difference of the driver's driving characteristics and the safe driver driving characteristics for the current roadway feature that vehicle 10 is traversing. When this difference exceeds a predetermined threshold, with the predetermined threshold established differently for each controllable or adjustable vehicle control system, the CPU 102 can select a parameter adjustment in step 218 for providing efficient and safe driving under the current roadway feature and roadway condition.

For example, regardless of the roadway feature, if the driver is drifting left or right of the center of the lane and the amount of drift, and the number of times the vehicle leaves the center of the lane compared with the safe driver driving characteristics under the same roadway condition and roadway feature, exceeds a threshold difference, the CPU 102 can select a vehicle control system parameter for adjustment. This parameter may be a simple warning by the vehicle interactive display 148 or and automatic decrease in the amount of accelerator pedal movement to slow the vehicle down. This particular control system actuation takes place in step 220. When drift is deflected, the control system may also manipulate the torque to individual vehicle wheels to control the vehicle.

As noted above, when the CPU 102 determines that the current vehicle driver is exhibiting driving characteristics which exceed, by a threshold amount, the safe driving characteristics from database 216 on the same current roadway features and roadway conditions of the vehicle 10, appropriate action can be taken. For example, a skilled driver might be able to take a significantly curved roadway segment, such as the curved exit lane 502 in FIG. 6, at a higher rate of speed, without endangering the vehicle 10 or leaving the exit lane 502 then a less skilled driver. The CPU 102 will differentiate the driving characteristics or score of each skilled or less skilled driver under the highly curved lane 502 when the amount of drift from the center of the curved lane 502 is calculated. For the higher skilled driver, the CPU 102 can determine that the driver is still in control of the vehicle and will not select any control system parameter for adjustment. However, for the same amount of duration of drift from the center of the lane 502 by a less skilled driver, the CPU 102 can determine for the less skilled driver, that the vehicle may be going out of control. The CPU 102 can than select a reduction in accelerator pedal position, light application of the brakes and/or an audible, visual, or tactile warning to the driver to slow down.

In the congested traffic examples shown FIG. 4, when the driver of vehicle 10C is following another vehicle 10D with a headway space 320 determined by the CPU 102 for the roadway feature and roadway conditions currently existing for the vehicles 10C and 10D and the speed of the vehicles 10C and 10D and whether or not the headway distance 320 is increasing or decreasing, the CPU 102 can select a parameter for adjustment, such as applying the brakes if the headway 320 is less than a threshold safe distance under the existing roadway and vehicle speed conditions.

The same headway distance calculations may be applied for the higher speed highway shown in 400 or 500. However, due to the typically higher rate of speed of the vehicle on the highway or freeway, the CPU 102 may determine that the headway distance 320 needs to be larger. When the CPU 102 determines that the headway distance 320 is less than a threshold safe distance as determined by the safe driver characteristics in database 216, the CPU 102 in lieu of an audible, visual, or tactile warning to the driver, can reduce the degree of fuel input to the vehicle by moving the accelerator pedal or lightly apply the brakes so as to increase the headway distance 320 to a safer distance. Again, the amount of headway distance 320, which meets the threshold safe distance under the existing roadway features and conditions of the vehicles 10C and 10D, will vary depending upon the skill of the particular driver of the vehicle 10C. Such driver skill can result in greater or less acceptable headway distance without parameter adjustment.

In summary, a unique driver specific vehicle control method and apparatus has been disclosed which, based on a driver's driving characteristic score for the particular roadway feature, roadway condition and vehicle condition can determine if a driver's driving characteristics fall within a safe threshold difference from safe driver driving characteristics. If the determination is that the current driver's driving characteristics exceed a threshold from the safe driving characteristics, the CPU 102 can implement selected parameter adjustment of one or more vehicle control systems, including issuing a warning to the driver and/or adjusting a parameter and implementing the parameter adjustment in a selected control system to maintain the vehicle in a safe driving condition.

In summary, a unique driver specific vehicle control method and apparatus has been disclosed which, based on a driver's driving characteristics score for the particular roadway feature can determine if the driver's driving characteristics fall within a safe threshold difference from a safe driver driving characteristics. If the determination is that the current driver driving characteristics exceed a threshold difference from the safe driver driving characteristics, the vehicle control can implement selected parameter adjustment of one or more vehicle control systems, including issuing a warning to driver and/or adjusting a control system parameter and implementing the parameter adjustment to maintain the vehicle in a safe driving condition.

What is claimed is:

1. A method for implementing driver specific vehicle controls in a vehicle operating in a manual operational mode, the method comprising:
   determining a driver's driving characteristics for a plurality of roadway features, roadway conditions, traffic conditions, and weather conditions in a vehicle having a plurality of adjustable vehicle control systems;
   determining a current roadway type over which the vehicle is moving;
   accessing a driver's driving characteristics score for the current roadway type;
   comparing the driver's driving characteristics score for the current roadway type with safe driver driving characteristics for the current roadway type;
   determining a number of times the vehicle drifts from the center of a lane in the current roadway type; and
   in response to determining the number of vehicle drifts exceeds a predetermined threshold for the current roadway type, manipulating individual vehicle wheel torque to control the vehicle.

2. The method of claim 1 further comprising:
   based on the comparison, selecting an additional vehicle control system parameter for adjustment if the driver's driving characteristics exceeds the safe driver driving characteristics by a threshold amount; and
   actuating a vehicle control system by the selected vehicle control system parameter for adjustment, wherein the adjustable vehicle control systems include at least one of vehicle traction control, vehicle stability control, vehicle acceleration, and vehicle braking.

3. The method of claim 1 further comprising:
   determining the number of times the vehicle drifts from a center of a lane of a roadway using at least one camera mounted on the vehicle, wherein the camera is positioned to image lane markers on both sides of a lane on the roadway.

4. The method of claim 1 further comprising:
   determining different driver driving characteristic scores for one or more of a straight roadway, a curved roadway, an urban roadway, a highway, a rural roadway and a multilane roadway.

5. The method of claim 1 further comprising:
   determining different driver driving characteristic scores for one or more of a straight urban roadway, a straight highway, a straight rural roadway, a curved urban roadway, a curved highway, a curved rural roadway, a congested traffic urban roadway, a congested traffic highway, an urban traffic light, and an urban stop sign.

6. The method of claim 1 further comprising:
   determining a driver's driving characteristic score based on one or more of a driver's skill level, a driver's years of driving experience, a driver's driving violations, and a driver's collisions.

7. The method of claim 1 further comprising:
   providing vehicle sensor outputs including one or more of outputs from at least one camera, a radar, map data, a GPS, a collision, acceleration and deceleration, and braking pedal force.

8. A method for implementing driver specific vehicle controls in a vehicle operating in a manual operational mode and having a plurality of vehicle control systems with adjustable parameters, the method comprising:
   providing a vehicle with one or more sensors capturing one or more outputs from at least one camera, a radar, map data, GPS, collision detectors, acceleration and deceleration sensors, and braking pedal force sensors;
   providing a processor executing a control program with instructions to:
      determine a driver's driving characteristics for a plurality of roadway features, roadway conditions, traffic conditions and weather condition;
      determine a current roadway type over which the vehicle is moving;
      access a driver's driving characteristics score for the current roadway type;
      compare the driver's driving characteristics score for the current roadway type with safe driver driving characteristics for the current roadway type;
      determining a number of times the vehicle drifts from the center of a lane in the current roadway type; and
      in response to determining the number of vehicle drifts exceeds a predetermined threshold for the current roadway type, manipulating individual vehicle wheel torque to control the vehicle.

9. The method of claim 8 wherein the processor is further configured to:
   based on the comparison, select an additional vehicle control system parameter for adjustment if the driver's driving characteristics exceeds the safe driver driving characteristics by a threshold amount; and
   actuate a vehicle control system by the selected vehicle control system parameter for adjustment, wherein the adjustable vehicle control systems includes at least one of vehicle traction control, vehicle stability control, vehicle acceleration, and vehicle braking.

10. The method of claim 8 wherein the processor is further configured to:
    determine the number of times the vehicle drifts from a center of a lane of a roadway using at least one camera mounted on the vehicle, wherein the camera is positioned to image lane markers on both sides of a lane on the roadway.

11. The method of claim 8 wherein the processor is further configured to:
    determine different driver driving characteristic scores for one or more of a straight roadway, a curved roadway, an urban roadway, a highway, a rural roadway, and a multilane roadway.

12. The method of claim 8 wherein the processor is further configured to:
    determine different driver driving skill characteristic scores for one or more of a straight urban roadway, a straight highway, a straight rural roadway, a curved urban roadway, a curved highway, a curved rural roadway, a congested traffic urban roadway, a congested traffic highway, an urban traffic light, and an urban stop sign.

13. The method of claim 8 wherein the processor is further configured to:
    determine the driver's driving characteristic score based on one or more of a driver's skill level, a driver's years of driving experience, a driver's driving violations, and a driver's collisions.

* * * * *